United States Patent Office 3,778,296
Patented Dec. 11, 1973

3,778,296
PROCESS FOR THE PRODUCTION OF SILICON CARBIDE WHISKERS
Eduard Thalmann, Zug, and Hans-Rudolf Staub, Eggenwil, Switzerland, assignors to Lonza Limited, Gampel, Valais, Switzerland
No Drawing. Filed May 4, 1971, Ser. No. 140,270
Claims priority, application Switzerland, May 14, 1970, 7,191/70
Int. Cl. C23c 13/04
U.S. Cl. 117—106 C
4 Claims

ABSTRACT OF THE DISCLOSURE

The present invention is concerned with a process for the production of silicon carbide whiskers by growing the whiskers at an elevated temperature on a substrate from a gaseous phase containing the whisker components, wherein there is used a substrate to which has been applied a layer comprising at least one crystal growth-promoting material, carbon and a lacquer.

BACKGROUND OF THE INVENTION

It is known that needle-shaped silicon carbide monocrystals, so-called whiskers, can be produced by the thermal decomposition of alkyl chlorosilanes made from quartz sand and carbon or from silicon and carbon. In "Physical Review," 143, 526/1966, there is described the reduction of a methyl chlorosilane with hydrogen at a temperature of 1350–1430° C., crystals of hexagonal silicon carbide thereby being deposited on a graphite substrate. By applying crystallisation-promoting materials, such as metals or metalloids, for example, chromium, aluminum, iron, cobalt, copper or silicon, at various places on the substrate, it is possible to increase the yield. However, in this case, the crystalline growth of the silicon carbide does not take place by the so-called vapor-liquid-solid (VLS) mechanism.

On the other hand, other authors (see Trans. Met. Soc. A.I.M.E., 233, 1055/1955) are of the opinion that the whisker growth can take place by a VLS mechanism. As solvent for the material to be crystallised, there is used a molten droplet of a metal which takes up the material from the gaseous phase and, after saturation, deposits this material on the substrate crystal lying under it. As metal, silicon has been used and, according to published Dutch patent specifications Nos. 6617544 and 6703609, iron which was applied to the substrate by coating or sprinkling on. However, this method of working has the disadvantage that the metal to be applied must not exceed a certain particle size. Whiskers of very small diameter are thereby formed. For most fields of use, however, the whiskers must have a comparatively large diameter. Furthermore, it is extremely difficult to maintain constant the concentration of the metallic iron to be applied on the substrate surface, not only locally but also from one batch to another.

Furthermore, from French patent specification No. 1,563,415, it is known to use substrates which contain iron in elementary form or in the form of iron oxide. Such a substrate is, for example, mullite (an aluminum silicate) which contains iron oxide as an impurity. This process suffers from the disadvantage that the substrate becomes inactive for whisker growth after a relatively short period of time due to the impoverishment of the iron.

If the gas phase contains chlorine, such as is expediently used according to the process of the above-mentioned French patent specification, then this reacts with the iron with the formation of iron chloride and the substrate becomes inactive more quickly.

It is an object of the present invention to avoid the disadvantages of the known processes.

SUMMARY OF THE INVENTION

According to the present invention, there is provided a process for the production of silicon carbide whiskers by growing the whiskers at an elevated temperature on a substrate from a gaseous phase containing the whisker components, wherein there is used a substrate to which has been applied a layer comprising at least one crystal growth-promoting material, carbon and a lacquer.

DETAILED DESCRIPTION OF THE INVENTION

As crystal-promoting material, there come into consideration metals and/or metal compounds, as well as mixtures thereof. Such materials include, for example, iron, nickel, manganese, chromium, iron chloride, iron sulphate, iron carbonate, iron oxide, nickel oxide and manganese oxide. Iron or iron compounds are preferably used.

As carbon, it is expedient to use active charcoal.

The process according to the present invention can be carried out at a temperature of 1100–1550° C.

The crystal growth-promoting material and carbon can be used in any desired ratio. However, they are advantageously used in a weight ratio of 1 to 0.5 to 1 to 2.

As lacquer, there can be used any synthetic or natural lacquer. By way of example, there can be used alkyd resin lacquers, polyvinyl acetate lacquers, nitro-cellulose lacquers, polyesters lacquers, oil lacquers, zapon lacquers or tar.

The amount of lacquer to be used is not critical and depends upon the consistency with which the layer is to be applied. Expediently, the amount of lacquer used is one which gives a readily coatable mass.

The substrates are coated with the mass. Upon heating, lacquer carbonises and the inorganic particles are embedded in a thin carbon layer. The result of this is that the crystal growth-promoting materials only pass slowly into the gaseous phase by the action of a halogen. In this way, it is ensured that, during the whole period of the reaction, a sufficiency of crystal growth-promoting materials is always present in the reaction chamber.

The amount of crystal growth-promoting materials, i.e. of inorganic material, to be applied to the substrate is advantageously 0.1 to 10 mg./cm.$^2$ of substrate and preferably 0.5 to 5 mg./cm.$^2$ of substrate.

As substrate, there can be used, for example, carbon, corundum, mullite, ceramic material or, preferably, graphite plates.

The following examples are given for the purpose of illustrating the present invention.

Example 1

5 g. iron oxide were mixed with 5 g. powdered active charcoal and subsequently added to 50 g. gyptal lacquer. (The gyptal lacquer used was a 50% solution in butyl acetate of a fatty acid-modified condensate obtained from glycerol and phthalic acid). There was thus obtained a readily coatable mass which was applied with a brush to a substrate plate made of graphite in an amount such that after evaporation of the solvent, there was obtained a thin film containing about 2.5 mg. iron oxide per cm.$^2$ of substrate.

Example 2

2.5 g. iron oxide and 2.5 g. manganese oxide were mixed with 5 g. active charcoal and subsequently dispersed in a polyester lacquer. (The polyester lacquer used was a 50% solution of "Desmophene 800" in ethyl acetate. "Desmophene 800" which is commercially available from Farbenfabriken Bayer A.G. of Leverkusen, Germany, is a polyester based on adipic acid, phthalic acid and a triol). The readily coatable mass was applied to a substrate plate made of graphite in an amount such that, after evaporation of the solvent, there was obtained a thin film containing about 2 mg. iron oxide and about 2 mg. manganese oxide per cm.² of substrate.

Example 3

A mass was prepared in the manner described in Example 1. However, instead of using a gyptal lacquer, there was used a 70% solution in styrene of a polyester commercially available from Farbenfabriken Bayer A. G. under the name "Roskydal 500": this is a polyester based on maleic acid, phthalic acid and glycol.

Example 4

A mass was prepared in the manner described in Example 1. However, instead of using a gyptal lacquer, there was used a 50% solution in toluene of a styrene-modified alkyd resin lacquer commercially available from Farbenfabriken Bayer A.G. under the name "Alkydal."

Example 5

Example 1 was repeated but, instead of the gyptal lacquer, there was used an aqueous dispersion of a terpolymer of 30% vinyl chloride, 45% vinyl acetate and 25% methyl acrylate.

The substrates obtained according to Examples 1 to 5 were placed in a reaction furnace, the vertical distance between the individual substrate plates being about 5 cm. Silicon powder (purity greater than 99.8½) and active charcoal were placed on the substrates. The reactor was evacuated and a reaction gas, which consisted of 72% hydrogen, 20% nitrogen and 8% methane, was passed through the reactor. The starting materials were heated to a temperature of 1400–1450° C. After about 8 hours, the reactor was cooled and opened. There were obtained silicon carbide whiskers with an average diameter of $2\mu$ and a length of several millimetres.

We claim:

1. In a process for the production of silicon carbide whiskers by contacting a substrate with a gaseous phase containing silicon, carbon and hydrogen at 1100 to 1550° C., the improvement which comprises employing a substrate to which there has been applied a layer consisting essentially of lacquer, carbon and a silicon carbide crystal growth promoting material, the ratio of silicon carbide crystal growth promoting material to carbon being 1:0.5 to 1:2.

2. A process according to claim 1 wherein the growth promoting material is selected from the group consisting of iron, nickel, manganese, chromium, iron chloride, iron sulphate, iron carbonate, iron oxide, nickel oxide and manganese oxide.

3. Process according to claim 1, wherein active charcoal is used as carbon.

4. Process according to claim 1, wherein 0.1 to 10 mg. of crystal growth-promoting material are applied per square centimetre of substrate.

References Cited

UNITED STATES PATENTS

| | | | |
|---|---|---|---|
| 3,346,414 | 10/1967 | Ellis | 117—106 |
| 3,519,472 | 7/1970 | Dyre et al. | 117—106 C |
| 3,275,722 | 9/1966 | Popper | 117—106 C |
| 3,095,316 | 6/1963 | Hartung | 117—106 C |

ALFRED L. LEAVITT, Primary Examiner

C. WESTON, Assistant Examiner